United States Patent Office 3,576,902
Patented Apr. 27, 1971

3,576,902
PROCESS FOR PREPARATION OF WAX RANGE LINEAR ALPHA OLEFINS
Roby Bearden, Jr., Baton Rouge, and Neville L. Cull, Baker, La., assignors to Esso Research and Engineering Company
No Drawing. Continuation-in-part of application Ser. No. 675,335, Oct. 16, 1967. This application Dec. 20, 1968, Ser. No. 785,791
Int. Cl. C07c 3/18
U.S. Cl. 260—683.15         8 Claims

ABSTRACT OF THE DISCLOSURE

An ethylene growth process for obtaining reaction product mixtures rich in linear $C_{22}$ to $C_{200}$ wax range olefins, especially linear alpha olefins of the $C_{30}$ to $C_{100}$ carbon number range. An ethylene oligomerization reaction is conducted in a nonpolar diluent in the presence of an oligomerization catalytic mixture consisting of a transition metal halide and an organo aluminum halide, previously modified by treatment with an organic phosphite or phosphine compound to yield said wax range olefins without substantial production of high molecular weight polymers. Pressures and temperatures are selected to maintain a molar ratio of ethylene to product olefins sufficient to minimize copolymerization of the product olefins, temperatures ranging generally up to about 75° C.

---

This is a continuation-in-part of application Ser. No. 675,335 filed Oct. 16, 1967.

Naturally occurring specialty waxes of which the mineral or microcrystalline waxes are representative are greatly valued for their hardness, luster and high melting points which range, e.g., from about 170° F. to 250° F. These waxes, used primarily as additive waxes to bolster the properties of the lower melting paraffin waxes, enjoy a large and growing market. However, it is doubtful that the current sources of these speciality waxes, i.e., crude oil stocks, are completely adequate and will thus put the microcrystalline waxes in short supply.

This same situation exists, perhaps to an even larger degree, for the naturally occurring animal and vegetable waxes, e.g., beeswax and Carnauba wax, which are widely used in polishing wax formulations. These waxes differ primarily from the microcrystalline waxes in that they contain functional groups, e.g., hydroxyl or carboxylic acid groups. The need for synthetic mineral, animal and vegetable waxes is clearly indicated.

It was recognized that some oligomers of alpha olefins have properties which make them quite desirable as waxes. The polymerization of ethylene to linear alpha olefins in the $C_{22}$–$C_{200}$ range would, it was recognized, provide an excellent source of high melting mineral waxes. Moreover, these olefin waxes would be ideal raw materials for the synthesis of the functionally substituted animal and vegetable waxes. The feasibility of a process based on polymerization of ethylene for producing such olefins, however, was in doubt.

Traditionally, ethylene is polymerized at selective conditions in the presence of catalytic complexes formed from mixtures consisting of transition metal halide, aluminum halides and organo aluminum compounds to yield various products. High molecular weight, high density polymers are formed in the presence of insoluble Ziegler type catalyst complexes produced, e.g., by reaction between titanium tetrachloride and aluminum triethyl. A characteristic of such reactions is that in the formation of the resultant insoluble catalytic complex, the titanium metal is reduced to a metal having a valence of three or below.

Oligomers, which have entirely different properties due, in part, to their very limited molecular weight, have also been prepared. The catalyst complexes used for conducting oligomerization reactions are entirely different and the reaction apparently proceeds by a different mechanism. For example, whereas average product molecular weight varies inversely with temperature in the reduced titanium system, molecular weight varies directly with temperature for the soluble oligomerization catalyst. The reactants used in the formation of these oligomerization catalyst complexes include transition metal halides and also organo aluminum halide compounds, added together in specified concentrations, to produce a soluble complex wherein the titanium metal of the complex is unreduced. Acidic metal halides and organo metal halides, e.g., $FeCl_3$, $AlBr_3$, $SnCl_4$, $SnEtCl_3$, may also be included in the catalyst formulation to improve activity and stability, particularly when the catalyst is used in nonpolar solvents. Reference is made to a copending application Ser. No. 804,006 filed Mar. 3, 1969 on the use of acidic metal halide modified oligomerization catalysts. It is thought that $TiCl_4$ reacts with $AlEt_2Cl$ to produce a highly polarized soluble covalent complex or perhaps an ion pair wherein the titanium metal is unreduced, or has a 4+ valence in accordance with the following simplified formulae:

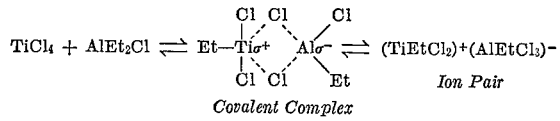

Covalent Complex      Ion Pair

In the formula Et represents the ethyl group. The $\sigma^+$ and $\sigma^-$ signs represent, respectively, the centers of low and high electron density in the complex. In the ion pair representation, the $\sigma$ signs (indicating partial development) are omitted to indicate a more fully developed ionic character.

In forming such oligomerization catalysts, the reactants are premixed in the polymerization diluent at conditions selected to optimize oligomerization catalyst formation, while discouraging formation of the insoluble Ziegler type catalysts. When ethylene is added to a solution of the oligomerization catalytic complex, at appropriate conditions, $C_4$ to $C_{60}$ oligomers, particularly the $C_4$ to $C_{22}$ oligomers, and especially Type I or linear alpha olefins, are selectively formed in very high concentrations to the exclusion of high molecular weight polymers, Type II ($RCH=CHR$), Type III ($R_2C=CH_2$), and Type IV ($R_2C=CHR$) olefins.

The carbon number range attainable with the oligomerization catalyst systems, however, is limited, and the desired $C_{22}$–$C_{200}$ wax range olefins are formed only in moderate amounts even under the most favorable conditions, viz., as when oligomerization is conducted in nonpolar diluents at relatively high temperatures. Unfortunately, as conditions are adjusted to favor formation of the desired oligomers, increasing yields of the undesirable high molecular weight polyethylene are encountered. Such phenomenon has militated against an ethylene oligomerization process for production of wax range olefins.

It is nonetheless the primary objective of the present invention to obviate these and other difficulties and, particularly, to provide a new and improved ethylene oligomerization process for the highly selective formation of reaction product mixtures containing high concentrations of $C_{22}$ to $C_{200}$ linear alpha olefins, especially $C_{30}$ to $C_{100}$ linear alpha olefins.

These objects and others are achieved in accordance with the present invention which is based on the discovery that organic phosphite and phosphine compounds can be used to modify the soluble oligomerization catalyst complexes formed from mixtures of unreduced transition metal halides and organo aluminum halides. The organic phosphite or phosphine compound, or mixture thereof, is added, admixed or otherwise incorporated within the catalytic mixtures prior to initiation of the ethylene oligomerization reaction in relatively small, critical concentrations, sufficient to alter, to some extent, the character of the soluble complex.

In our earlier copending application, supra, it was disclosed that an organic phosphite or phosphine modified oligomerization catalyst could be advantageously employed in a polar solvent system to selectively favor the production of $C_4$ to $C_{22}$ linear alpha olefins, or olefins of average molecular weight ranging from about 70 to 300, as opposed to the formation of substantial amounts of high molecular weight polyethylene. The organic phosphite or phosphine compound was added to the catalyst, in critical but relatively low concentrations ranging from about 5 to 50 percent, and preferably from about 10 to 20 percent, based on the moles of transition metal halide present in the catalytic mixture, prior to or at the time the catalytic components were brought together.

The present invention is a process for the production of linear alpha olefins of average molecular weight falling within the wax range, i.e., olefins of carbon chain numbers ranging from $C_{22}$ to $C_{200}$ and preferably $C_{30}$ to $C_{100}$. It is based on the surprising discovery that the oligomerization catalysts can be modified with critical but higher concontrations of the organic phosphite or phosphine compounds to produce, in nonpolar solvents, wax range olefins.

In preparation of the catalyst, the organic phosphite or phosphine modifier, in suitable concentration is added to or incorporated within the oligomerization catalyst mixture for a time sufficient to effect the desired change. The time at which the modifier is added during the catalyst preparation step does not appear critical. Preferably, it is added to the polymerization diluent prior to addition of the catalyst components and definitely prior to initiation of the ethylene oligomerization reaction. Suitably, the oligomerization catalyst mixture is separately treated with the modifier for a period ranging from about five minutes to about one-half hour. The modifier can be added to the oligomerization catalyst mixture, or solvent containing the catalyst mixture, to effect the modification in effective concentrations ranging up to about 300 mole percent, based on the moles of transition metal halide. Higher concentrations can be used but are not generally desirable because once modification is effected, the excess modifier often destroys completely the activity of the catalyst.

The concentration of the modifier utilized in forming the catalyst determines the number average molecular weight ($\overline{M}n$) of the product olefins at a given set of polymerization conditions. Although the extent of the change depends on the effectiveness of the organic phosphite or phosphine, it has been generally found that $\overline{M}n$ decreases with increasing concentration thereof up to about 300 mole percent based on the transition metal halide used in forming the catalyst complex. The most substantial gains in product $\overline{M}n$ are obtained with modifier concentration in the range of 50–150 mole percent.

The modified catalyst is contacted with ethylene at pressures sufficient to maintain a molar ratio of ethylene to product olefins sufficient to suppress copolymerization reactions with the oligomer olefins. The ethylene oligomerization reaction is conducted at temperatures ranging from about 0° C. to about 75° C., and preferably from about 20° C. to about 50° C. pursuant to which conditions the normal alpha olefin carbon range of a product can be shifted from one having an average molecular weight ranging from about 70 to about 200 to one ranging from about 200 to about 400 without substantial production of high molecular weight polymers, i.e., molecular weight above about 100,000.

The selectivity of the catalytic mixture in forming wax range oligomers, as opposed to low average molecular oligomers or high molecular weight, xylene insoluble polyethylene, is enhanced by modification with an organic phosphine or phosphite compound, preferably one corresponding to the formula YY'Y"P wherein P is phosphorus and Y, Y' and Y" are the same or different groups, substituents or radicals selected from hydrogen, alkyl, cycloalkyl, aryl, and alkoxy. At least one of the substituents Y, Y' and Y" is alkyl, cycloakyl, aryl, or alkoxy. The alkyl, cycloakyl, aryl, and alkoxy groups can contain from 1 to about 20 carbon atoms, but preferably contain from about 2 to about 3 carbon atoms. The tertiary phosphine and phosphite compounds are the most preferred as, inter alia, they are the most reactive and produce the greatest benefits from a cost-effectiveness standpoint. The trialkyl phosphines are the most preferred compounds and, in general, produce greater yields of wax range linear alpha olefins.

Exemplary of such compounds are ethyl phosphine, butyl phosphine, diamyl phosphine, dioctyl phosphine, triethyl phosphine, tributyl phosphine, trioctyl phosphine, tridodecyl phosphine, octyl didodecyl phosphine, trinonadecyl phosphine, n-propyl phosphite, triethyl phosphite, trioctyl phosphite, tridodecyl phosphite, trioctadecyl phosphite and the like.

In forming the catalytic complex, the transition metal halide and the alkyl aluminum halide are normally brought together in the presence of the phosphite or phosphine compound, which is contained in the polymerization diluent. In such pretreatment, the catalyst components (transition metal halide and the alkyl aluminum halide) are added together under conditions which minimize reduction of the transition metal halide. Typical catalyst pretreatment conditions include the formation of transition metal halide concentrations ranging from about 0.002 molar to about 0.5 molar, and preferably from about 0.005 molar to about 0.01 molar. The treatments are carried out at times ranging from about 2 to about 120 minutes, and preferably from about 5 to about 30 minutes. Temperatures range from about 0° C. to about 75° C. and preferably from about 20 to about 50° C. These conditions of pretreatment significantly affect catalyst activity and the average molecular weight of oligomer produced, and hence are to be observed in formation of the catalyst.

The modifiers cause an increase in the average molecular weight of the total olefin product and shift or increase the carbon number of the linear alpha olefin chain to favor the formation of wax range olefins. The average molecular weight, as well as the yield, of the oligomer olefins in the wax range is favorably influenced by use of the organic phosphine or phosphite modifiers.

In the process described in the parent application, the use of a phosphine or phosphite modifier at relatively low concentrations, in polar solvents, permitted shifting of the average molecular weight of the oligomer product from about 114 to about 125, thus increasing the yield of oligomers in the range desirable for detergents. By optimizing conditions, and with care, it was only possible to increase the number average molecular weight to as high as about 150. In accordance with the present invention, however, the average molecular weight can be readily shifted to 200 and above, thus substantially increasing the yield of oligomers of interest as waxes, wax modifiers and oil soluble detergents. Olefins with carbon numbers ranging from $C_{22}$ to $C_{160}$ can be obtained with relatively insignificant amounts of high molecular weight polymer byproduct. The mechanism of the modification is not fully understood but it is likely that the modifier reduces the partial positive charge on the titanium (believed responsible for high rate of chain transfer to chain propagation), and by so doing reduces the rate of chain transfer resulting in an increase in the average molecular weight of the olefins produced.

Applicants, however, do not desire to be bound by a specific theory, but whatever the mechanism, there is a definite response of the original catalyst to the modifier addition, manifested by increased yields of high molecular weight wax olefins.

The unmodified catalyst employed in the reaction system is a complex reaction product which is substantially soluble in the polymerization system. The complex is obtained by partially reacting a reducible, heavy transition metal halide, the metallic portion of which is selected from Groups IV–B, VI–B, and VIII, of the Periodic Chart of the Elements, with an aluminum alkyl halide compound such that the ultimate formula of the aluminum alkyl compound is $AlR_nX_{3-n}$, wherein $n$ is less than 2 and preferably less than 1, R is alkyl, cycloalkyl or aralkyl, preferably containing from 1 to about 20 carbon atoms, for example, methyl, ethyl, isobutyl, cyclohexyl, benzyl, etc., and X is chlorine, bromine or iodine. The preferred transition metal used in forming the complex is a titanium compound having a valency of 4, as represented by the formula: $TiX_aA_b$, wherein $a=3$ or 4, $b=0$ or 1, and $a+b=4$, X=chlorine or bromine and A is chlorine, bromine or an anion derived from a protonic compound such as an alcohol (R'OH) or a carboxylic acid (R'COOH). The R' of the protonic compound can be an alkyl, aryl, aralkyl or cycloalkyl group. The $TiX_aA_b$ component can be made in situ by reacting $TiX_4$ with the protonic compound. Thus, the preferred transition metal component of this invention may be selected from the groups $TiX_4$, $TiX_3OR'$ and $TiX_3OOCR'$. Typical examples of such compounds are $TiCl_4$, $TiBr_4$, $TiX_3OC_2H_5$ and $TiX_3OOCH_3$.

The aluminum alkyl halide component is generally of the formula $RAlX_2$ or, in some cases, a mixture of components $RAlX_2$ and $R'R''AlX$ wherein R, R' and R'' are similar or dissimilar and thus represent a hydrocarbon radical such as alkyl, cycloalkyl or aralkyl containing, preferably, from 1 to about 20 carbon atoms, and X is a halogen such as chlorine, bromine or iodine.

The molar ratio of alkyl aluminum halide to the transition metal halide in forming the complex is not critical to this invention as long as the $AlR_nX_{3-n}$ reaction product has the proper formula. The ratio can be 0.1/1 to 150/1 or more. Catalyst concentration is normally in the range of 0.1 to 10 grams per liter of diluent.

Ethylene is unique in the instant invention in that other olefins do not respond to give linear alpha olefins. Therefore, it is desirable to use essentially pure ethylene or mixtures of ethylene with inert gases as the feed for the process of this invention. Ethylene feeds containing minor amounts of other olefins can be used but it must be realized that the copolymerization will, to some extent, decrease product linearity.

The polymerization diluent is a very important feature of this invention. Nonpolar diluents are preferred, inasmuch as polar solvents undesirably decrease the average molecular weight of the product. Aliphatic and naphthenic diluents are quite satisfactory, and are preferred. They are useful alone or in admixture with polar solvents, but increased admixtures with polar solvents tend to produce lower average molecular weight. Moreover, liquid ethylene can be used as a solvent. This offers the advantage, in commercial processes, of eliminating the need for solvent recovery systems.

Illustrative of the useful aliphatic solvents are hexane, 2,3-dimethyl butane, 2-methyl-3-ethyl hexane, hexadecane, nonadecane, heptadecane, and industrial mixtures such as kerosene, light naphthas and the like. Suitable naphthenes are cyclohexane, cyclopentane, butylcyclopentane, 1,4-diethylcyclohexane, and the like.

The oligomerization reaction must be conducted at sufficient pressure to avoid the formation of highly branched olefins and to obtain linear olefins in high selectivities. Although some variations in pressure are permitted, depending upon the catalyst composition, diluent and temperature, the pressure should be maintained above about 100 p.s.i.g. in order to produce commercially attractive yields (at least above 5 weight percent and preferably above 10 weight percent olefins in the reactor effluent) of linear alpha olefins having a purity greater than about 90 percent. Pressures can range as high as 1000 p.s.i.g., and higher, but at very high ethylene pressures the process may become uneconomical because of the equipment requirements and ethylene recycle. Preferably, the pressure ranges from about 200 p.s.i.g. to about 600 p.s.i.g. of ethylene pressure.

The ratio of moles of ethylene to the moles of products must be above about 0.8 in order to effect the selective synthesis of ethylene to linear olefins. The preferred molar ratio of ethylene to products is above about 5.0. The upper limit of the mole ratio of ethylene to product must be above 0.8 or the product formed contains more than 10 percent branched chain olefins at product concentrations required to obtain commercially attractive yields.

The process of this invention is carried out at selected conditions of temperature and pressure which will convert the ethylene to olefin product. Temperature selection permits some control of the average molecular weight of the product. Preferably, the reaction can be carried out at temperatures below about 75° C., but more preferably it is carried out at between about 20° C. and about 50° C.

Reaction times are not particularly critical when operating under the preferred conditions and they will normally be in the range of 0.1 to 5 hours to obtain product concentrations greater than 5 percent by weight in the diluent. The process can be carried out in batch or continuous operation. However, high product purity and high concentration are achieved most easily in batch reactions or in continuous systems operating under essentially plug flow.

The oligomerization reaction is not generally carried to completion, but quenched to terminate the reaction at an optimum desired time. After the catalyst has been effectively quenched, e.g., by adding isopropyl alcohol, the residues can be removed from the products in any conventional way, such as washing with water or aqueous caustic, adsorption, ion exchange resins, and the like.

The following comparative data and illustrative examples bring out the more salient features of the invention.

EXAMPLES

The following is illustrative of the experimental procedure used in preparing and modifying the catalysts for individual ethylene oligomerization runs.

Catalyst preparation

Approximately 400 ml. of dry n-heptane (or diluent noted) was charged to a dry, oxygen-free 500 ml. flask equipped with a serum cap. An organic phosphine or phosphite modifier was injected or added into the heptane followed by injection of $TiCl_4$. The mixture was then treated with an aluminum alkyl halide or mixture of aluminum alkyl halides to effect catalyst formation. After approximately 5–6 minutes pretreatment time (from the point of alkyl addition) at 25° C. and in the absence of light, the catalyst solution was charged to the reactor autoclave.

The concentration of catalyst in the diluent, with regard to total moles of catalyst components, was in the range of 0.03 to 0.08 molar. The concentration of active catalyst, assumed to be equal to the concentration of $TiCl_4$ was in the range of 0.01 to 0.02 molar. The molar ratios of catalyst components used in the various runs are recorded with the tabulated data below.

The control was similarly prepared except that the modifier addition step was omitted from the procedure.

Oligomerization

The oligomerization reactions were carried out in a 2-liter Parr autoclave. The contents of the autoclave were precooled to 0° C. prior to charging the catalyst solution. After the catalyst was added, ethylene (dry and oxygen-free) was pressured into the autoclave. The pressure in the autoclave was maintained at 556–600 pounds by adding ethylene as needed. The temperature rose quite rapidly and was maintained at 35° centigrade for one hour unless otherwise noted.

A run was terminated by pressuring in isopropanol while the reactor was still under reaction conditions. The quenched product was stirred for approximately 5 minutes and the unreacted ethylene vented off through a Dry Ice trap and wet test meter. After all the ethylene had been vented, the autoclave was weighed prior to disassembly to obtain a yield figure. The autoclave was then disassembled and the total product removed. A sample of the product was analyzed on a G.C. column to obtain product distribution data. The yield of liquid olefins is given in the tabulation below.

Product workup

The alcohol quenched product was water-washed using two 500 ml. portions of deionized water. After separating off the water, the amount of high molecular weight polyethylene, insoluble in heptane at 90° C. was determined by filtration, air drying and finally drying for 1 hour in a vacuum oven at 125° C. and 26″ Hg vacuum. The filtered liquid product (heptane plus ethylene oligomers) was dried and analyzed using capillary G.C. techniques. Product linearity (weight percent linear alpha olefin in $C_{12}$–$C_{20}$ fraction) was determined, and in all instances found to be better than 90 percent. The product average molecular weight ($\overline{Mn}$) of the olefins and other product characteristics were determined from the product distribution obtained by gas chromatography.

The data given in Table I below shows the effect of an organic phosphine, e.g., tributylphosphine (TBP), in boosting the average molecular weight of the alpha olefins prepared in a nonpolar heptane diluent. The effect of the tributylphosphine modifier, in Examples 1 through 4, is shown by comparison with control runs wherein no modifier was used. The effect of the modifier is shown by comparative runs made at different temperatures and catalyst concentrations.

TABLE I

Example 1:
Catalyst comp. (moles): 1TiCl$_4$, 4AlEtCl$_2$
Polymerization: 35° C., 650 p.s.i.g.

| Mole percent TBP on TiCl$_4$: | Product $\overline{Mn}$ | Wt. percent $C_{22+}$ in product |
|---|---|---|
| 0 | 191 | 42 |
| 100 | 252 | 60 |

Example 2:
Catalyst comp. (moles): 1TiCl$_4$, 4AlEtCl$_2$
Polymerization: 35° C., 650 p.s.i.g.

| Mole percent TBP on TiCl$_4$: | Product $\overline{Mn}$ | Wt. percent $C_{22+}$ in product |
|---|---|---|
| 0 | 100 | 42 |
| 100 | 240 | 57 |
| 130 | 300 | 69 |

Example 3:
Catalyst comp. (moles): 1TiCl$_4$, 4AlEtCl$_2$
Polymerization: 35° C., 650 p.s.i.g.

| Mole percent TBP on TiCl$_4$: | Product $\overline{Mn}$ | Wt. percent $C_{22+}$ in product |
|---|---|---|
| 0 | 181 | 38 |
| 100 | 234 | 55 |

Example 4:
Catalyst comp. (moles): 1TiCl$_4$, 4AlEtCl$_2$
Polymerization: 35° C., 650 p.s.i.g.

| Mole percent TBP on TiCl$_4$: | Product $\overline{Mn}$ | Wt. percent $C_{22+}$ in product |
|---|---|---|
| 0 | 190 | 42 |
| 100 | 240 | 58 |

The data in Example 5 further illustrate the beneficial effects of the organic phosphines on increasing yields of olefin waxes. In this case, an aryl phosphine, triphenylphosphine was employed.

Example 5:
Catalyst comp. (moles): 1TiCl$_4$+5AlEtCl$_2$
Polymerization: 35° C., 650 p.s.i.g.

| Mole percent TPP on TiCl$_4$: | Product $\overline{Mn}$ | Wt. percent $C_{22+}$ in product |
|---|---|---|
| 0 | 190 | 42 |
| 100 | 252 | 60 |

The data in Example 6 illustrate the increase in olefin product $\overline{Mn}$ as a result of catalyst modification with triethylphosphite.

Example 6:
Catalyst comp. (moles): 1 TiCl$_4$+5 AlEtCl$_2$
Polymerization: 35° C., 650 p.s.i.g. $C_2H_4$

| Mole percent TEP on TiCl$_4$ | Product $\overline{Mn}$ | Wt. percent $C_{22+}$ in product |
|---|---|---|
| 0 | 188 | 42 |
| 100 | 236 | 56 |

The following Table II presents data showing the effect of the concentration of the modifiers of this invention on catalyst activity in polar vs. nonpolar solvents.

The data in Example 7 illustrate the effect of tributylphosphine (TBP) on the catalyst system of the parent case in xylene diluent. As noted, catalyst activity is destroyed at 100 mole percent TBP on TiCl$_4$. In Example 8, a modified catalyst, activated and stabilized by excess TiCl$_4$, was evaluated with TBP both in xylene and in n-heptane. Again, in the polar xylene diluent, 100 mole percent TBP destroyed catalyst activity. By contrast, in nonpolar heptane, the catalyst still retained some activity even at 200 mole percent TBP on TiCl$_4$.

TABLE II

Example 7:
Catalyst comp. (moles): 1 TiCl$_4$+1 AlEtCl$_2$+ 0.5 AlEt$_2$Cl
Polymerization: 2° C., 500 p.s.i.g. $C_2H_4$

| Diluent | Mole percent TBP on TiCl$_4$ | Catalyst activity, g. oligomers/g. TiCl$_4$/hr. |
|---|---|---|
| Xylene | 0 | 220 |
| Do | 10 | 190 |
| Do | 50 | 100 |
| Do | 100 | 0 |

Example 8:
Catalyst comp. (moles): 1 TiCl$_4$+1 AlEtCl$_2$+ 0.5 AlEt$_2$Cl plus 2TiCl$_4$ in excess.
Polymerization: Temp. noted, 500–600 p.s.i.g. $C_2H_4$

| Diluent | Mole percent TBP on TiCl$_4$* | Polymerization temp., °C. | Catalyst activity*, g. oligomers/g. TiCl$_4$/hr. |
|---|---|---|---|
| Xylene | 0 | 2 | 350 |
| Do | 100 | 2 | 0 |
| Do | 100 | 25 | 0 |
| Heptane | 0 | 20 | 70 |
| Do | 50 | 30 | 160 |
| Do | 100 | 20 | 124 |
| Do | 200 | 25 | <10 |

*Calculation does not include excess TiCl$_4$.

It is apparent that various modifications and changes can be made without departing the spirit and scope of the invention.

Having described the invention, what is claimed is:

1. A process for preparing wax range linear alpha olefins comprising polymerizing ethylene in the presence of a nonpolar diluent, at a temperature and pressure sufficient to liquefy the ethylene while suppressing copolymerization reactions, said temperature ranging below 50° C. in the presence of a catalyst formed on reacting a titanium halide selected from the group consisting of $TiX_4$, $TiX_3OR'$ and $TiX_3OOCR'$, wherein X is selected from the group consisting of chlorine and bromine and R' is selected from the group consisting of alkyl, aryl, aralkyl, and cycloalkyl with an aluminum alkyl halide compound such that the ultimate formula of the aluminum alkyl compound is $AlR_nX_{3-n}$, wherein R is selected from the group consisting of alkyl, aralkyl, and cycloalkyl, X is selected from the group consisting of chlorine, bromine and iodine, and $n$ is less than 2, in the presence of a modifier selected from the group consisting of organic phosphite and phosphine compounds, said modifier being characterized by the formula YY'Y''P wherein P is phosphorus, Y is one selected from the group consisting of alkyl, cycloalkyl and alkoxy, Y' and Y'' each being one selected from the group consisting of hydrogen, alkyl, cycloalkyl and alkoxy, said titanium halide and alkyl aluminum halide being added under conditions which minimize reduction of the titanium halide, said modifier being present in a concentration ranging from 50 to 300 mol percent based on the moles of titanium halide initially present.

2. A polymerization process according to claim 1, wherein the modifier is added in concentration ranging from 50 to 150 mole percent, based on the moles of titanium halide initially present.

3. A polymerization process according to claim 1, wherein each of the substituents in the modifier contains from 2 to 3 carbon atoms.

4. A polymerization process according to claim 1, wherein the catalyst is formed on reacting titanium tetrachloride with alkyl aluminum chloride in the presence of tributylphosphine said titanium tetrachloride and alkyl aluminum chloride being added under conditions which minimize reduction of the titanium tetrachloride.

5. A polymerization process according to claim 1, wherein the temperature of the reaction ranges from 0° C. to 50° C.

6. A polymerization process according to claim 5 wherein the reaction is conducted at temperatures ranging from 20° C. to 50° C. and at pressures ranging from 100 p.s.i.g. to 1000 p.s.i.g.

7. The process of claim 1 wherein the added modifier is triphenylphosphine.

8. A process according to claim 1 wherein said process is carried out in the presence of a nonpolar diluent selected from the group consisting of hexane, 2,3-dimethyl butane, 2-methyl-3-ethylhexane, nonadecane, heptadecane, cyclohexane, cyclopentane, butylcyclopentane, 1,4-diethyl cyclohexane.

References Cited
UNITED STATES PATENTS 3,081,287  3/1963  Coover et al. _____ 260—93.7

PAUL M. COUGHLAN, Jr., Primary Examiner

U.S. Cl. X.R.

252—429; 260—94.9